INVENTORS:
William P. Stevens, Jr.
Arthur Nitikman
By Herbert E. Metcalf
His Patent Attorney United States Patent Office
2,812,912
Patented Nov. 12, 1957

2,812,912

INCLINED ENGINE INSTALLATION FOR JET AIRCRAFT

William P. Stevens, Manhattan Beach, and Arthur Nitikman, Inglewood, Calif., assignors to Northrop Aircraft, Inc., Hawthorne, Calif., a corporation of California Application August 6, 1953, Serial No. 372,644

6 Claims. (Cl. 244—74)

The present invention relates to jet propelled aircraft and more particularly to a novel type of installation of a gaseous combustion jet engine in such aircraft particularly suitable for use in long range, guided missiles.

Among the objects of the invention are:

To provide a jet engine installation, in aircraft, having an unusually low drag.

To provide a jet engine installation in an aircraft that creates only a minimum increase in wetted skin area on the aircraft.

To provide a jet engine installation in an aircraft which results in a low trim drag.

To provide a jet engine installation in an aircraft permitting trimmed flight with elevons close to neutral position.

To provide a jet engine installation for an aircraft which results in lower thrust being required for a given total drag.

To provide a jet engine fuselage installation in an aircraft wherein only a minimum volume of the fuselage is utilized for the engine, and to provide a jet propelled aircraft capable of carrying relatively large amount of stores in the fuselage thereof.

Briefly, the present invention is applied to an aircraft such as a guided missile having a fuselage with a gaseous combustion turbo-jet engine positioned at the extreme end of that fuselage and extending forwardly with the longitudinal axis of the engine at an acute downward angle to the longitudinal axis of the aircraft, the two axes crossing close to the jet exhaust port of the engine, so that the air inlet to the engine is just below the lower surface of the fuselage.

Various advantages and features of the present invention will be readily understood from a perusal of the ensuing description of the drawings showing one preferred form of the invention, in which.

Figure 1:
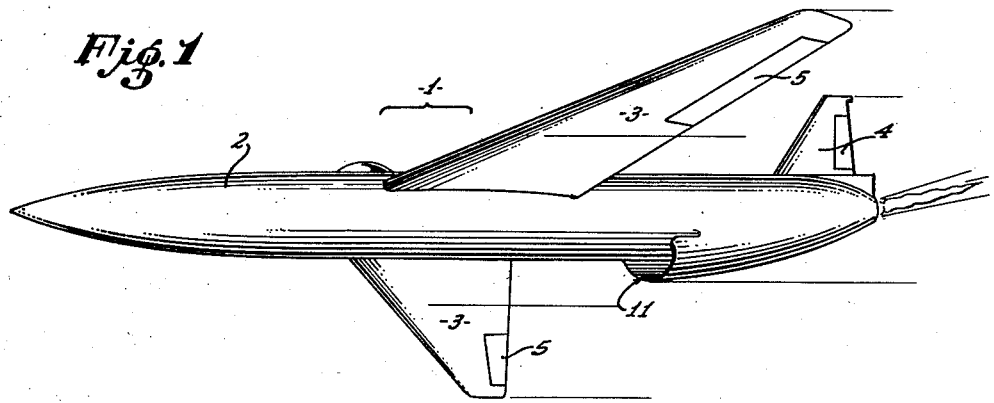
Figure 1 is a diagrammatic perspective view of an aircraft in which a jet engine is installed in accordance with the present invention.
Figure 2:
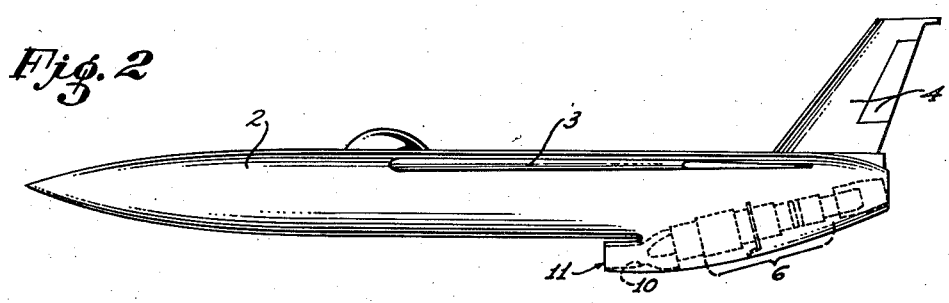
Figure 2 is a diagrammatic side elevational view showing how the jet engine is installed in the aircraft of Figure 1.
Figure 3:
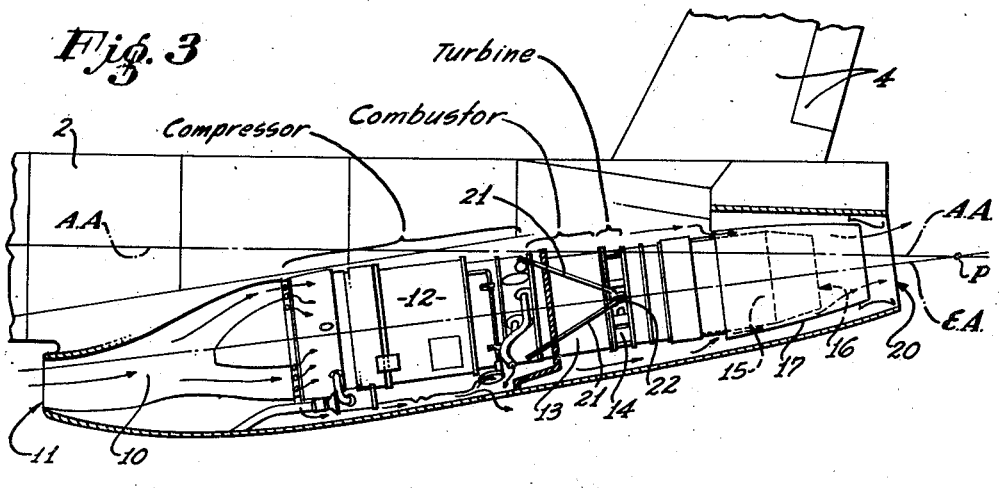
Figure 3 is an enlarged diagrammatic side view partly in section and partly in elevation of the rear portion of the fuselage of the aircraft shown in Figures 1 and 2.

Referring to the figures, an airplane 1 is provided with a generally cigar shaped fuselage 2, swept back wings 3, and a vertical tail and rudder assembly 4 on the rear of said fuselage. No horizontal tail is needed as elevons 5 on the swept back wings can act as both ailerons and elevators and for other reasons hereinafter set forth.

At the extreme rear of the fuselage 2 a jet engine assembly 6 is installed, this assembly consisting, from front to rear, of an air intake duct 10 having a forward facing opening 11, a compressor section 12, a combustor section 13, a turbine section 14 and a tail pipe 15 having a rearwardly facing jet exhaust port 16, surrounded by an aspirating shroud 17 which terminates at a fuselage end opening 20.

The engine assembly 6 is mounted in the fuselage 2 with the jet exhaust port 16 inside of and substantially concentric with the fuselage jet opening 20 at the extreme rear end of the fuselage 2 and is inclined downwardly and forwardly with a preferred angle of about 7.5° between the longitudinal axis AA of the airplane 1 and the longitudinal axis EA of the engine assembly 6.

Both of the axes AA and EA pass through the openings 16 and 20 and intersect at a point P just beyond the fuselage end opening 20. Thrust from the engine assembly 6 is transferred to the fuselage 2 through thrust struts 21 attached to engine assembly 6 on each side thereof at thrust connections 22 in the plane of the axis EA.

The forwardly facing opening 11 of the air intake duct 10 is positioned in a plane at right angles to the longitudinal axis AA so that maximum ram recovery is obtained when the airplane is in horizontal level flight, the flight attitude at cruising speed being with the longitudinal axis AA inclined approximately 5° upward from the horizontal plane. In this attitude, the jet exhaust exits at 2.5° upwardly, and the jet thrust is applied below airplane axis AA.

The inclined engine installation herein described has many advantages, some of which are as follows:

(1) Lower engine installation drag due to following reasons:

(a) Air inlet located low and inclined down so that duct may be shorter and deflection of the inlet air reduced.

(b) Exhaust located high at back of fuselage so that the pressure drag on the upper surface of fuselage is reduced.

(c) A minimum increase in wetted skin area is needed to house the engine since only the inlet extends outside the basic fuselage contours.

(d) Due to inclination of engine, the accessories normally located below engine do not increase the frontal area of the installation.

(2) Lower trim drag due to the moment of the engine thrust about the center of gravity. This permits trimmed, stable flight with the elevons close to neutral position. The inclined engine arrangement also permits pitch and climb control by means of jet thrust change, i. e. as by engine throttle manipulation.

(3) Lower thrust required for a given total drag since the resultant air forces on the aircraft are inclined forward from a perpendicular to the fuselage reference line and the minimum thrust required occurs when the engine thrust line is perpendicular to the resultant air force.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an airplane having wings and a fuselage terminating in a jet engine exhaust opening through which the longitudinal axis of said fuselage passes, a jet engine assembly including a forwardly opening air intake duct and a rearwardly opening tail pipe mounted with the end of said tail pipe generally concentric with and adjacent said opening, said engine assembly extending forwardly and downwardly with the longitudinal axis of said engine assembly at an acute angle to the axis of said fuselage and intersecting said latter axis adjacent to said opening, said angle being such as to position the opening of said air intake duct adjacent and below the lower surface of said fuselage, both of said axes being in the same vertical plane.

2. In an airplane having wings and a fuselage terminating in a jet engine exhaust opening through which the longitudinal axis of said fuselage passes, a jet engine assembly including a forwardly opening air intake duct and a rearwardly opening tail pipe mounted with the end of said tail pipe generally concentric with and adjacent to said opening, said engine assembly extending forwardly and downwardly with the longitudinal axis of said engine assembly at an acute angle to the axis of said fuselage and intersecting said latter axis adjacent to said opening, said angle and the length of said assembly being such as to position the opening of said air intake duct adjacent and below the lower surface of said fuselage, both of said axes being in the same vertical plane, the plane of said opening of said air intake being substantially at right angles to the longitudinal axis of said airplane.

3. In an airplane having wings and a fuselage terminating in a jet engine exhaust opening through which the longitudinal axis of said fuselage passes, a jet engine assembly including an air intake duct and a tail pipe mounted with the end of said tail pipe concentric with and adjacent to said exhaust opening, said engine assembly extending forwardly and downwardly with the axis of said engine assembly at an acute angle to the axis of said fuselage and intersecting said latter axis adjacent to said exhaust opening, said angle and the length of said assembly being such as to position the opening of said air intake duct adjacent and below the lower surface of said fuselage, both of said axes being in the same vertical plane, and thrust connections on each side of said engine assembly between said engine assembly and said fuselage between said air intake duct and said tail pipe in the plane of the longitudinal axis of said engine assembly.

4. In an airplane having wings and a fuselage, a jet engine exhaust opening at the rear of said airplane at the general level of the longitudinal axis of the airplane, a jet engine assembly including a forwardly opening air intake duct and a rearwardly opening tail pipe mounted with the end of said tail pipe generally concentric with and adjacent said opening, said engine assembly extending forwardly and downwardly with the longitudinal axis of said engine assembly at an acute angle to the axis of said fuselage and intersecting the plane of said latter axis adjacent to said opening, said angle being such as to position the opening of said air intake duct adjacent and below the lower surface of said fuselage.

5. In an airplane having wings and a fuselage, a jet engine exhaust opening at the rear of said airplane at the general level of the longitudinal axis of the airplane, a jet engine assembly including a forwardly opening air intake duct and a rearwardly opening tail pipe mounted with the end of said tail pipe generally concentric with and adjacent said opening, said engine assembly extending forwardly and downwardly with the longitudinal axis of said engine assembly at an acute angle to the axis of said fuselage and intersecting the plane of said latter axis adjacent to said opening, said angle being such as to position the opening of said air intake duct a substantial distance below the plane of said latter axis adjacent and below the lower surface of said fuselage.

6. In an airplane having wings and a fuselage, a jet engine exhaust opening at the rear of said airplane at the general level of the longitudinal axis of the airplane, a jet engine assembly including a forwardly opening air intake duct and a rearwardly opening tail pipe mounted with the end of said tail pipe generally concentric with and adjacent said opening, said engine assembly extending forwardly and downwardly with the longitudinal axis of said engine assembly at an acute angle to the axis of said fuselage and intersecting the plane of said latter axis adjacent to said opening, said angle being such as to position the opening of said air intake duct a substantial distance below the plane of said latter axis, the plane of said opening of said air intake duct being substantially at right angles to the longitudinal axis of said fuselage.

References Cited in the file of this patent

UNITED STATES PATENTS 2,557,522     Vautier _____ June 19, 1951

OTHER REFERENCES

Flight Magazine, page 30, January 10, 1946, picture of B. V. P-194.